(12) United States Patent
Fadell et al.

(10) Patent No.: US 6,995,963 B2
(45) Date of Patent: Feb. 7, 2006

(54) METHODS AND APPARATUS FOR CHARGING A BATTERY IN A PERIPHERAL DEVICE

(75) Inventors: Anthony M. Fadell, Portola Valley, CA (US); Christoph Krah, San Jose, CA (US)

(73) Assignee: Apple Computer, Inc., Cupertino, CA (US)

( * ) Notice: Subject to any disclaimer, the term of this patent is extended or adjusted under 35 U.S.C. 154(b) by 539 days.

(21) Appl. No.: 10/278,752

(22) Filed: Oct. 22, 2002

(65) Prior Publication Data

US 2003/0075993 A1  Apr. 24, 2003

Related U.S. Application Data

(60) Provisional application No. 60/345,253, filed on Oct. 22, 2001.

(51) Int. Cl.
*H02H 7/00* (2006.01)
(52) U.S. Cl. ...................................................... 361/18
(58) Field of Classification Search ............... 361/18
See application file for complete search history.

(56) References Cited

U.S. PATENT DOCUMENTS

| | | | | |
|---|---|---|---|---|
| 4,673,861 A | * | 6/1987 | Dubovsky et al. | 320/114 |
| 5,150,031 A | * | 9/1992 | James et al. | 320/164 |
| 5,307,002 A | * | 4/1994 | Ho et al. | 320/139 |
| 5,471,128 A | * | 11/1995 | Patino et al. | 320/128 |
| 5,675,813 A | * | 10/1997 | Holmdahl | 713/310 |
| 5,754,027 A | * | 5/1998 | Oglesbee et al. | 320/122 |
| 5,845,217 A | | 12/1998 | Lindell et al. | 455/557 |
| 6,125,455 A | * | 9/2000 | Yeo | 714/14 |
| 6,130,518 A | * | 10/2000 | Gabehart et al. | 320/103 |
| 6,169,387 B1 | * | 1/2001 | Kaib | 320/132 |
| 6,178,514 B1 | * | 1/2001 | Wood | 713/300 |
| 6,184,652 B1 | * | 2/2001 | Yang | 320/110 |
| 6,184,655 B1 | * | 2/2001 | Malackowski | 320/116 |
| 6,204,637 B1 | * | 3/2001 | Rengan | 320/137 |
| 6,211,649 B1 | * | 4/2001 | Matsuda | 320/115 |

(Continued)

FOREIGN PATENT DOCUMENTS

WO   WO 99/26330    5/1999

(Continued)

OTHER PUBLICATIONS

International Search Report in corresponding PCT application PCT/US02/33856 dated Mar. 14, 2003.

*Primary Examiner*—Stephen W. Jackson
*Assistant Examiner*—James A. Demakis
(74) *Attorney, Agent, or Firm*—Beyer Weaver & Thomas, LLP

(57) ABSTRACT

A power manager for managing power delivered to a battery operated peripheral device is disclosed. The power manager includes an input current limiter arranged to suppress a power surge associated with an insertion event by a power cable arranged to provide an external voltage. A voltage converter unit coupled to the input current limiter converts the received external voltage to a supply voltage that is transmitted by way of a main bus to a voltage sensor unit coupled thereto. During the insertion event, a comparator unit coupled to the voltage sensor, sends a first switching signal to a switchover circuit that responds by connecting the peripheral device and an uncharged battery to the main bus such that the supply voltage is provided thereto. When the battery is substantially fully charged, the switchover circuit responds by electrically disconnecting the battery so as to not overcharge the battery.

16 Claims, 11 Drawing Sheets

U.S. PATENT DOCUMENTS

| | | | |
|---|---|---|---|
| 6,218,812 B1 * | 4/2001 | Hanson | 320/161 |
| 6,252,380 B1 | 6/2001 | Koenck | 320/150 |
| 6,271,605 B1 * | 8/2001 | Carkner et al. | 307/125 |
| 6,316,916 B2 * | 11/2001 | Bohne | 320/150 |
| 6,348,776 B2 * | 2/2002 | Kim | 320/110 |
| 6,357,011 B2 * | 3/2002 | Gilbert | 713/300 |
| 6,362,610 B1 * | 3/2002 | Yang | 323/281 |
| 6,363,491 B1 * | 3/2002 | Endo | 713/310 |
| 6,487,442 B1 * | 11/2002 | Wood | 600/515 |
| 6,489,751 B2 * | 12/2002 | Small et al. | 320/150 |
| 6,614,232 B1 * | 9/2003 | Mukai | 324/426 |
| 6,633,932 B1 * | 10/2003 | Bork et al. | 710/72 |
| 6,774,604 B2 * | 8/2004 | Matsuda et al. | 320/110 |
| 2002/0070705 A1 * | 6/2002 | Buchanan et al. | 320/116 |
| 2003/0054703 A1 * | 3/2003 | Fischer et al. | 439/894 |

FOREIGN PATENT DOCUMENTS

WO      WO 00/39907      7/2000

\* cited by examiner

METHODS AND APPARATUS FOR CHARGING A BATTERY IN A PERIPHERAL DEVICE

BACKGROUND OF THE INVENTION

1. Field of Invention

This invention relates generally to computing systems. Specifically, a method and apparatus for managing power delivered by way of a FireWire cable to a battery operated peripheral device.

2. Description of Related Art

FireWire is an IEEE1394 compliant High Performance Serial Bus that provides two types of data transfer: asynchronous and isochronous. Asynchronous is for traditional load-and-store applications where data transfer can be initiated and an application interrupted as a given length of data arrives in a buffer. Isochronous data transfer ensures that data flows at a pre-set rate so that an application can handle it in a timed way while providing the bandwidth needed for audio, imaging, video, and other streaming data. Isochronous service means it guarantees latency or the length of time between a requested action and when the resulting action occurs which is a critical feature in supporting real time video, for example. FireWire provides a high-speed serial bus with data transfer rates of 100, 200, or 400 Mbps as well as a single plug-and-socket connection on which up to 63 devices can be attached with data transfer speeds up to 400 Mbps (megabits per second). In this way, FireWire offers a standard, simple connection to all types of consumer electronics, including digital audio devices, digital VCRs and digital video cameras; as well as to traditional computer peripherals such as optical drives and hard disk drives.

The standard FireWire cable consists of six wires in which data is sent via two separately-shielded twisted pair transmission lines that are crossed in each cable assembly to create a transmit-receive connection. Two more wires carry power (8 to 28 v, 1.5 A max.) to remote devices. In some cases, such as with DV camcorders manufactured by the Sony Corporation of Japan, a 4 conductor FireWire cable is used (configured as the 6 wire cable but without the power wires) that terminate in smaller, 4 prong connectors. To connect a four prong device, such as the Sony DV camcorder with a standard IEE1394 FireWire device or interface card, an adapter cable is required having 4 prongs on one side and 6 on the other. In this way, the data lines are connected while omitting the power connection.

In those situations, however, when a battery operated six prong peripheral device is coupled to a FireWire cable, it is important for the power delivered to the device (typically 1.8 v, 3.3, or 5.0 v) to be both stable and reliable especially when the FireWire cable is either connected or disconnected.

Therefore, what is required is a method and apparatus for managing power delivered by way of a FireWire cable to a battery operated peripheral device.

SUMMARY OF THE INVENTION

According to the present invention, methods, apparatus, and systems are disclosed for providing a cascadable state machine for broadcast content is disclosed.

In one embodiment, a power manager for managing power delivered to a battery operated peripheral device is disclosed. The power manager includes an input current limiter arranged to suppress a power surge associated with an insertion event by a power cable arranged to provide an external voltage. A voltage converter unit coupled to the input current limiter converts the received external voltage to a supply voltage that is transmitted by way of a main bus to a voltage sensor unit coupled thereto. During the insertion event, a comparator unit coupled to the voltage sensor, sends a first switching signal to a switchover circuit that responds by connecting the peripheral device and an uncharged battery to the main bus such that the supply voltage is provided thereto. When the battery is substantially fully charged, the switchover circuit responds by electrically disconnecting the battery so as to not overcharge the battery. During a cable removal event, the comparator unit sends a second signal to the switchover circuit which responds by substantially simultaneously disconnecting the main bus from the peripheral device and connecting the battery to the peripheral device.

In another embodiment, a method for managing power delivered to a battery operated peripheral device is disclosed. Suppressing a power surge associated with an insertion event by a power cable arranged to provide an external voltage. Converting the received external voltage to a supply voltage and sending the converted voltage by way of a main bus to a voltage sensor unit coupled thereto. During the insertion event, sending a first switching signal to a switchover circuit that responds by connecting the peripheral device and an uncharged battery to the main bus. Wherein when the battery is substantially fully charged, the switchover circuit responds by electrically isolating the battery from the powered cable. During a cable removal event, sending a second signal to the switchover circuit which responds by substantially simultaneously disconnecting the main bus from the peripheral device and connecting the battery to the peripheral device.

In still another embodiment, an apparatus for managing power to a battery-operated peripheral device is described. The apparatus includes means for receiving an external voltage from an external voltage supply by way of a cable, wherein the cable includes a number of lines some of which are data lines arranged to form a transmit-receive connection and some of which are power lines arranged to carry the external voltage from the external power supply to the device means for converting a received external voltage to a supply voltage, means for sensing a voltage, means for generating a switching signal based upon the sensed voltage, means for receiving the switching signal by a switchover circuit, and means for connecting the peripheral device and an uncharged battery to the supply voltage in response to the received switching signal.

BRIEF DESCRIPTION OF THE DRAWINGS

The invention will be better understood by reference to the following description taken in conjunction with the accompanying drawings.

DETAILED DESCRIPTION OF SELECTED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

In a battery powered FireWire compatible device, a method and apparatus for supplying power to the device that can be used to either operate the device of charge the device's battery are described. In one embodiment, various power signals on a FireWire data bus coupled to the device, provide for operating the device and/or charging the device's internal battery over a prescribed range of supply voltages. In a particular embodiment, the apparatus includes a built in surge suppression unit as well as a FireWire power/battery switchover unit to ensure that a stable and reliable power supply is provided the device. In this way, additional power connectors are substantially eliminated thereby saving product cost and reducing product size.

The invention will now be described in terms a FireWire peripheral power management unit suitable for supplying power to any FireWire compatible device. Such devices include, for example, personal digital assistants, personal MP3 player/recorders, and the like.

Figure 1A:
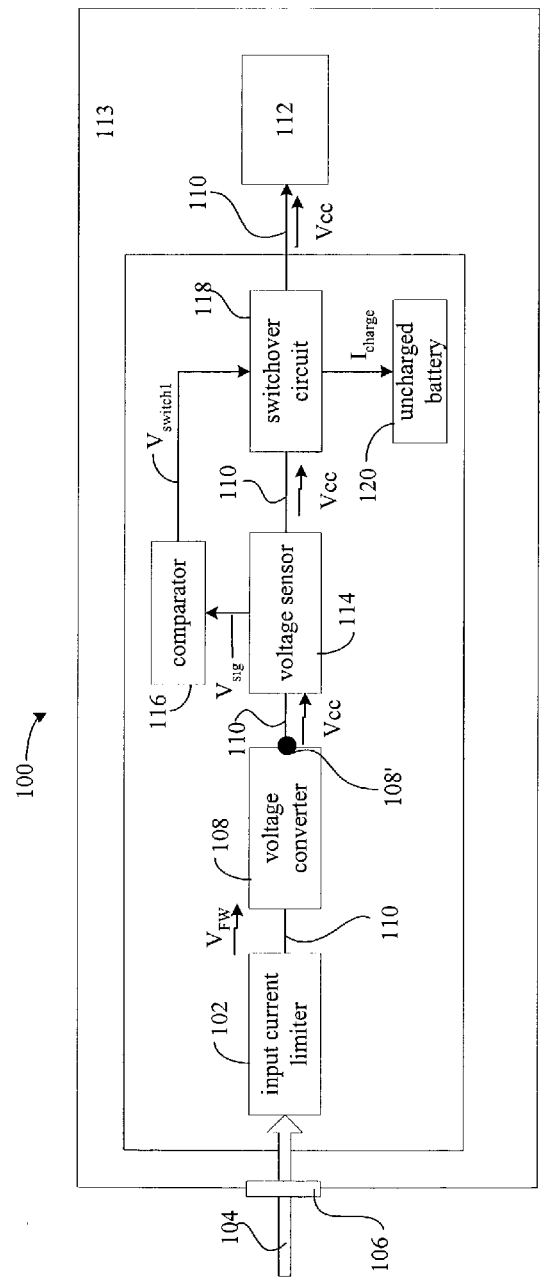
FIG. 1A shows a power manager unit with a fully discharged battery coupled to an active FireWire cable in accordance with an embodiment of the invention.

Accordingly, FIG. 1A shows a power manager unit 100 with a fully discharged battery coupled to an active FireWire cable in accordance with an embodiment of the invention. The power manager unit 100 includes an input current limiter 102 for suppressing a power surge caused by a FireWire cable insertion event related to voltage transients (i.e., ground bounce) associated with an insertion of a powered FireWire cable 104 to an input port 106. It should be noted, that this phenomenon is only applicable to those peripheral devices capable of receiving a FireWire cable having a power wire included therein (such as a six prong type FireWire cable). The input current limiter 102 is, in turn, coupled to a voltage converter unit 108 having an output 108' arranged to convert a received external voltage $V_{ext}$ (in the form of a FireWire voltage $V_{FW}$ having a range of between 8 volts and 28 volts provided by the FireWire cable 104) to a supply voltage $V_{cc}$ provided to a main bus 110. Typically, the supply voltage $V_{cc}$ can be approximately 1.8 volts, approximately 3.3 volts, or approximately 5.0 volts each of which is suitable for driving an active circuit 112 included in a battery operated peripheral device 113.

Figure 1B:
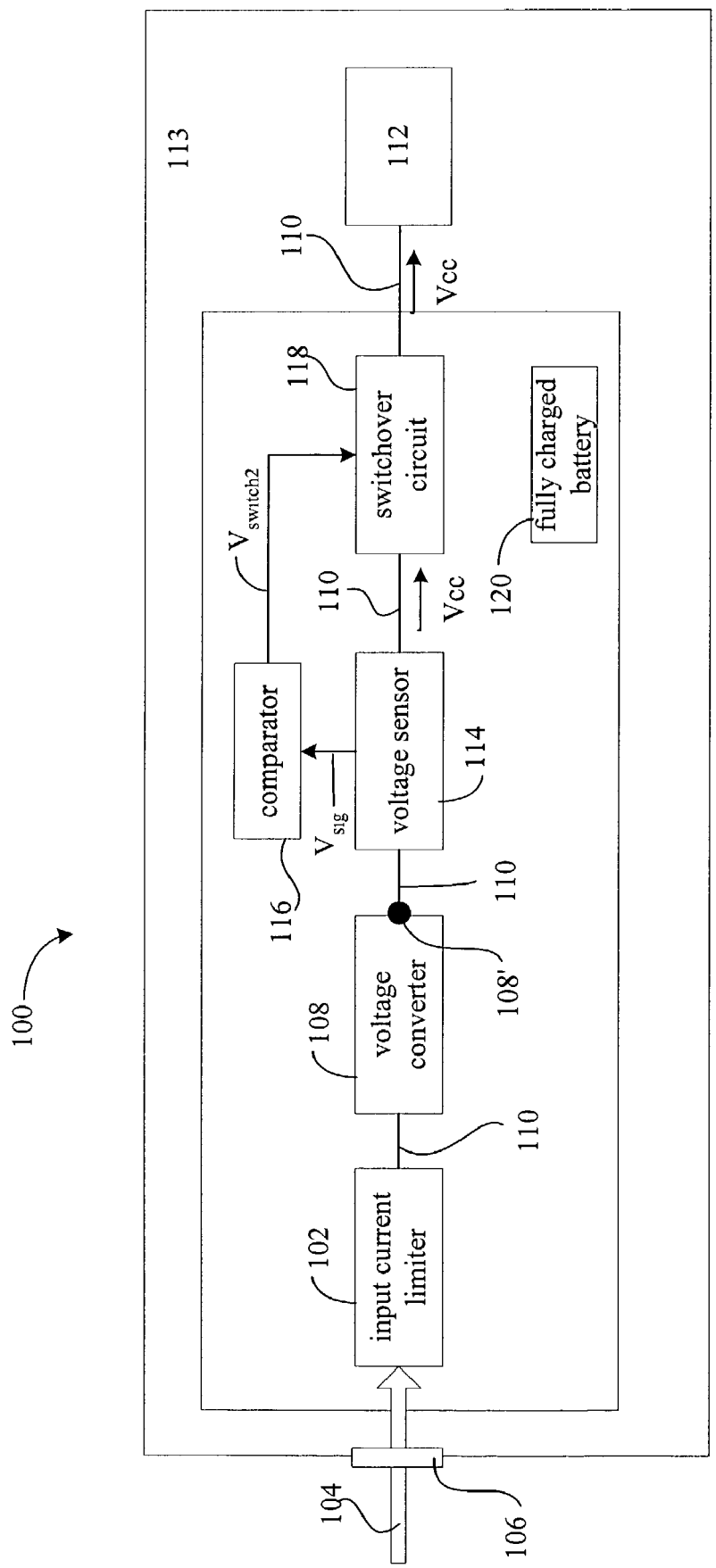
FIG. 1B shows the power manager unit of FIG. 1A where the battery is fully charged in accordance with an embodiment of the invention.

In the described embodiment, the voltage converter unit 108 is coupled to a voltage sensor 114 arranged to provide a voltage signal $V_{sig}$ to a comparator unit 116. The comparator unit 116, based upon the voltage signal $V_{sig}$, provides a switchover signal $V_{switch}$ to a switchover circuit 118. In those cases where the voltage signal $V_{sig}$ is above a voltage threshold $V_{th}$ (indicative of a FireWire insertion event having had occurred at the input port 106), the comparator unit 116 provides a first switchover signal $V_{switch1}$ to the switchover circuit 118. The switchover circuit 118, in turn, responds to the first switchover signal $V_{switch1}$ by connecting the main bus 110 to the active circuit 112 (and thereby the supply voltage $V_{cc}$) and to a battery 120 when the battery 120 is substantially uncharged so as to provide a charging current to the battery 120. As shown in FIG. 1B, in those cases where the battery 120 is substantially fully charged, the comparator circuit 116 sends a second switchover signal $V_{switch2}$ that causes the switchover circuit 118 to disconnect the battery 120 from the main bus 110 so as to avoid overcharging the battery 120.

Figure 1C:
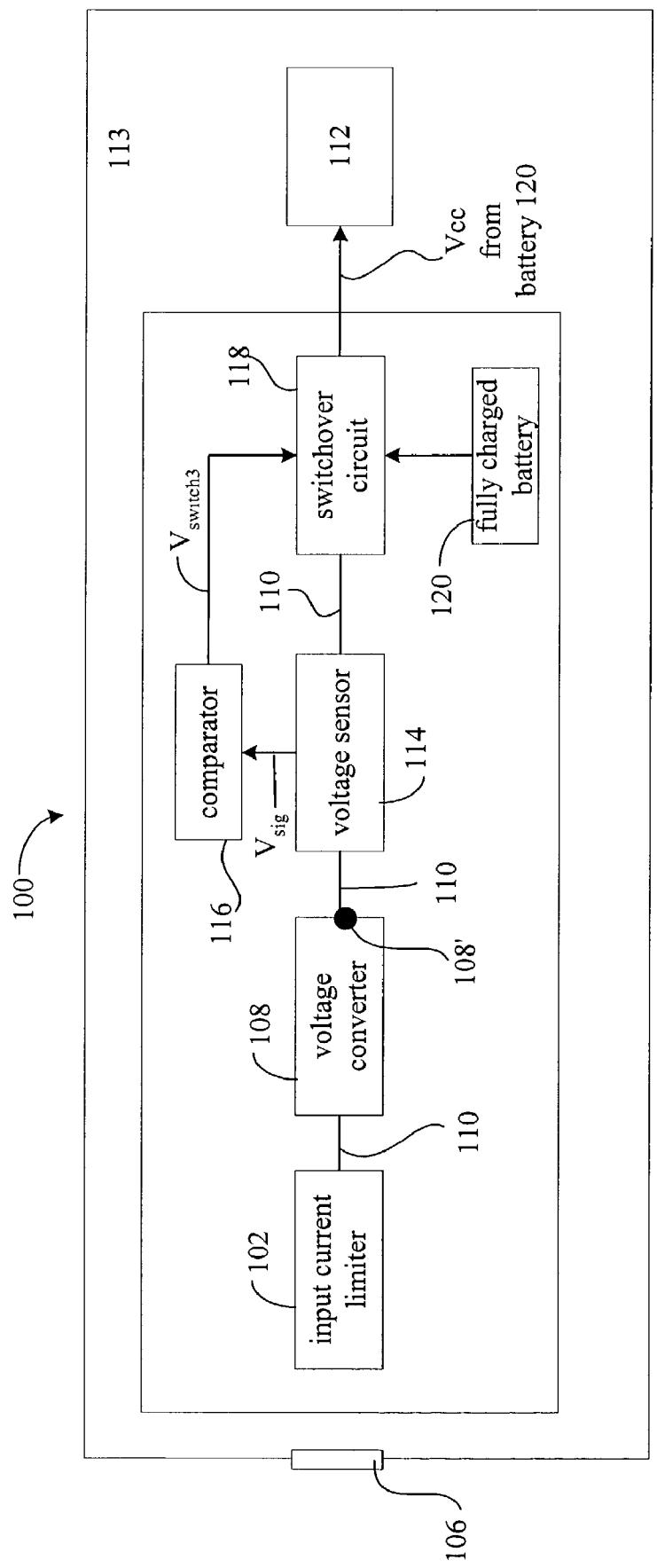
FIG. 1C shows the power manager unit of FIG. 1B where the FireWire cable of the invention.

In those situations shown in FIG. 1C where the powered FireWire cable 104 has been disconnected from the port 106, the voltage signal $V_{sig}$ is below the voltage threshold $V_{th}$ to which the comparator circuit 116 responds by providing a third switchover signal $V_{switch3}$ to the switchover circuit 118. The switchover circuit 118 responds to the third switchover signal $V_{switch3}$ by disconnecting the main bus 110 from the active circuit 112 and connecting the battery 120 in such a manner as to provide a substantially uninterrupted supply voltage $V_{cc}$ to the active circuit 112.

Figure 2:
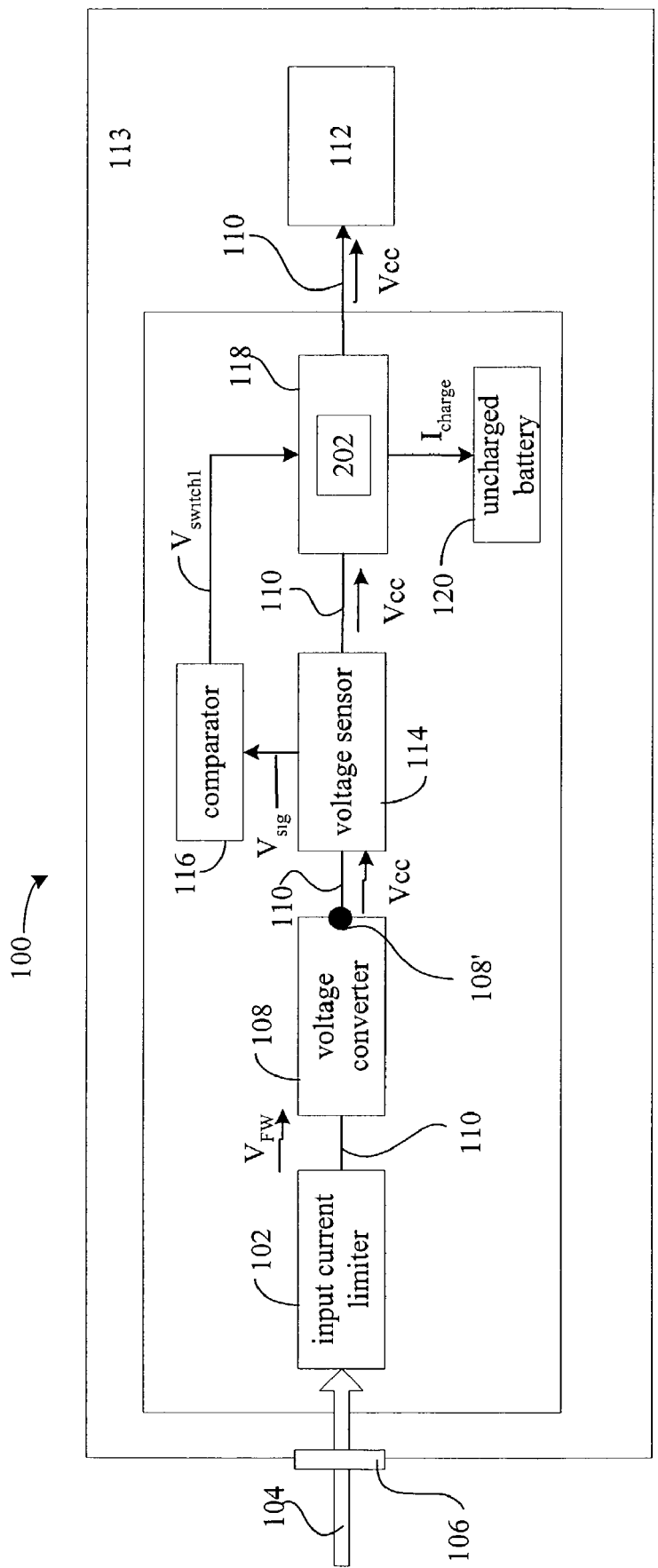

Referring to FIG. 2, the switchover circuit 118 includes a comparator 202 that helps to ensure a smooth transition from battery to FireWire power and vice versa. The switch over circuit 118 ensures that the voltage on the main supply bus 110 (VCC_MAIN) doesn't drop below a pre-determined minimum voltage $V_{min}$ (at which point a reset signal is typically provided). Accordingly, the FireWire voltage converter 108 switches in/out when the voltage on the main bus 110 ($V_{CC\_MAIN}$) has risen/dropped above/below $V_{min}$.

Figure 3:
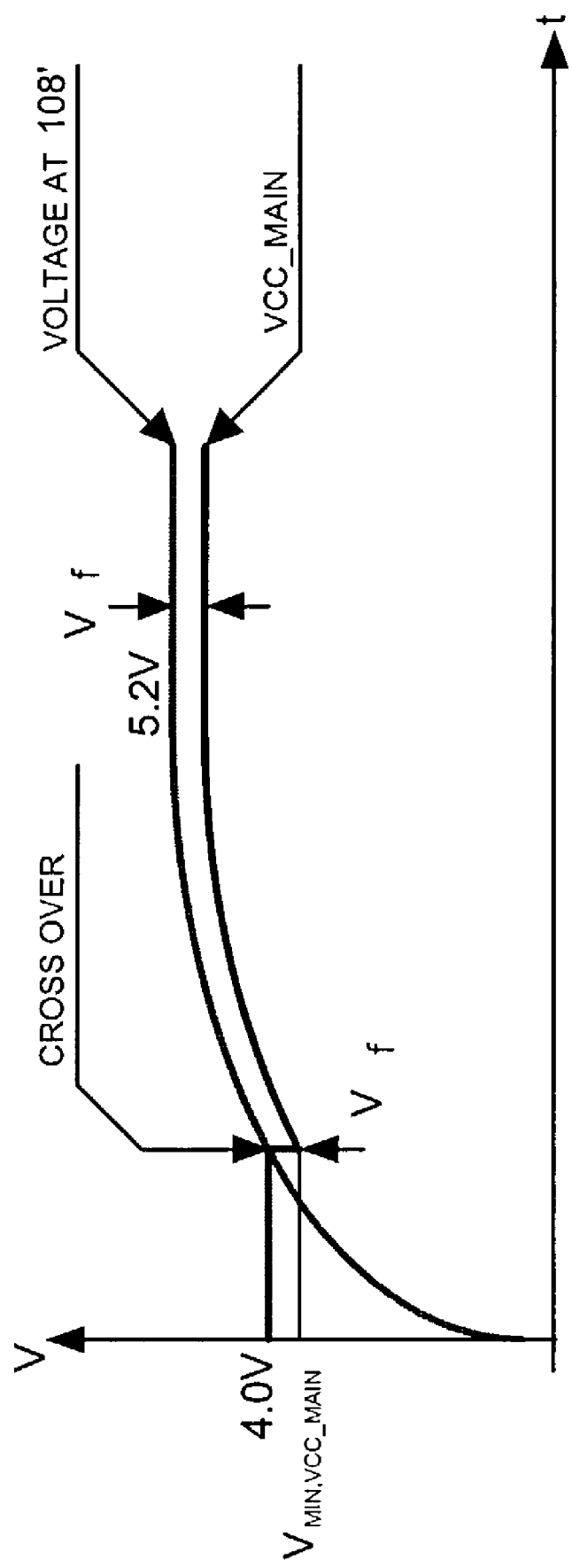
FIG. 3 shows an exemplary response waveforms for the switchover state where the battery is fully charged.

FIG. 3 shows an exemplary response waveforms for the switchover state where the battery is full and the FireWire is plugged in. After the FireWire cable 104 is plugged into the port 106, the output of the FireWire voltage converter 108 reaches its destination voltage within 15 ms. When the output of the FireWire voltage converter 108 reaches the switch over threshold $V_{switch}$, the comparator 202 disconnects battery power from the main supply bus 110. For a short period of time, neither the battery 120 nor the FireWire voltage converter 108 supply power to VCC_MAIN 110 and the voltage on VCC_MAIN 110 will drop until either of the voltage sensor 114 starts conducting such that the voltage cannot drop below the voltage $V_{MIN}$. Eventually the voltage sensor 114 starts conducting, pulling the voltage on bus 110 up to a pre-set voltage drop $V_f$ below the destination output voltage of the FireWire voltage converter 108.

Figure 4:
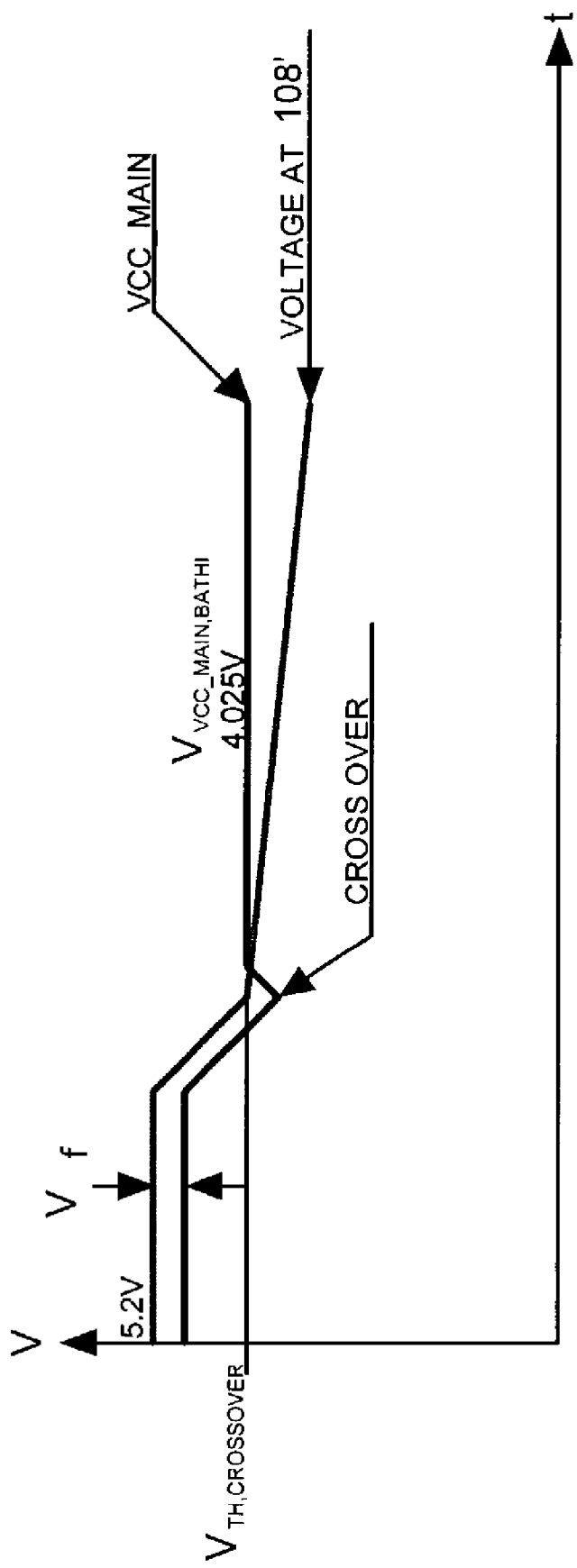
FIGS. 4 and 5 show an exemplary response waveforms for the switchover state where the battery is full and the FireWire is unplugged in two separate scenarios.
Figure 5:
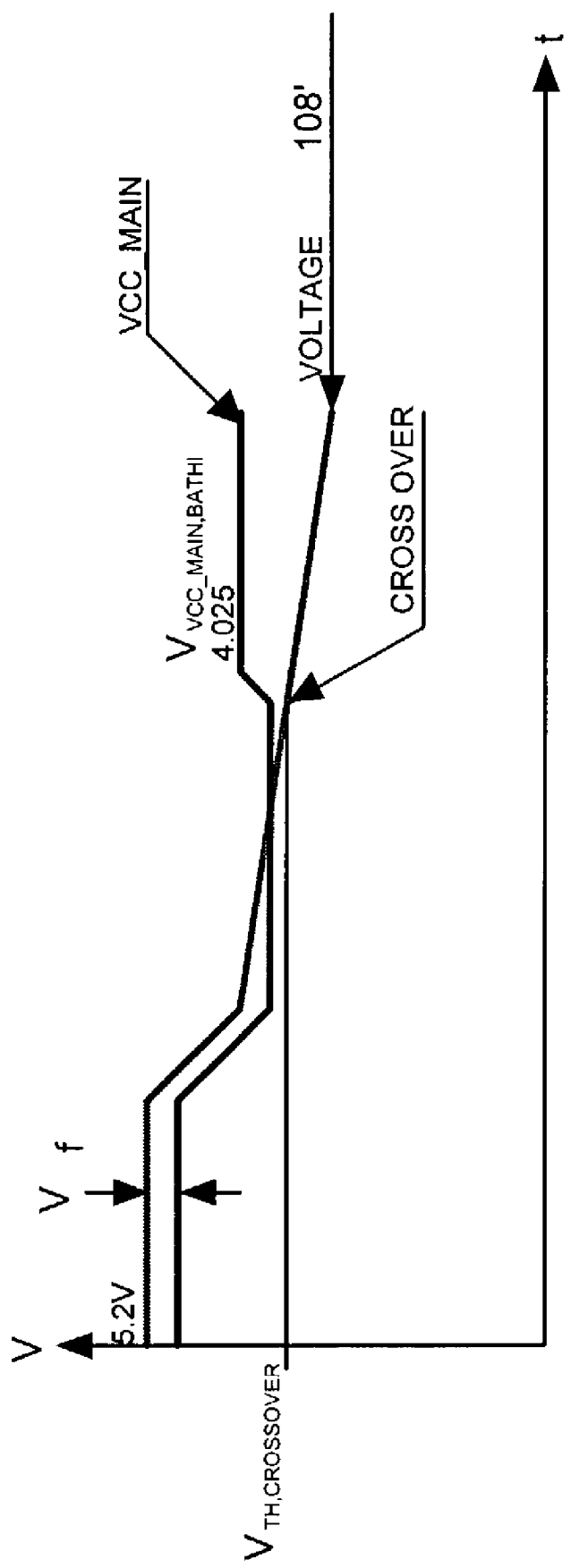

FIGS. 4 and 5 show an exemplary response waveforms for the switchover state where the battery is full and the FireWire is unplugged in two separate scenarios. Initially, the voltage $V_{VCC\_MAIN}$ is $V_f$ below the voltage of the FireWire voltage converter 108. Due to the system load, the output voltage of the FireWire voltage converter 108 is going to drop rapidly as the voltage sensor 114 discharges into the main supply bus 110. When FireWire 106 is unplugged the voltage at the output of the FireWire voltage converter 108 is going to drop rapidly until the voltage sensor 114 starts conducting. At this point the voltage at the output of the FireWire voltage converter 108 may or may not have not dropped below the switch over threshold Vswitch.

There will be two possible scenarios:

In one scenario shown in FIG. 4, the comparator threshold has been crossed in which case, the battery 120 has to make up for the voltage $V_f$. In a second scenario shown in FIG. 5, the comparator threshold has not been crossed.

Figure 6:
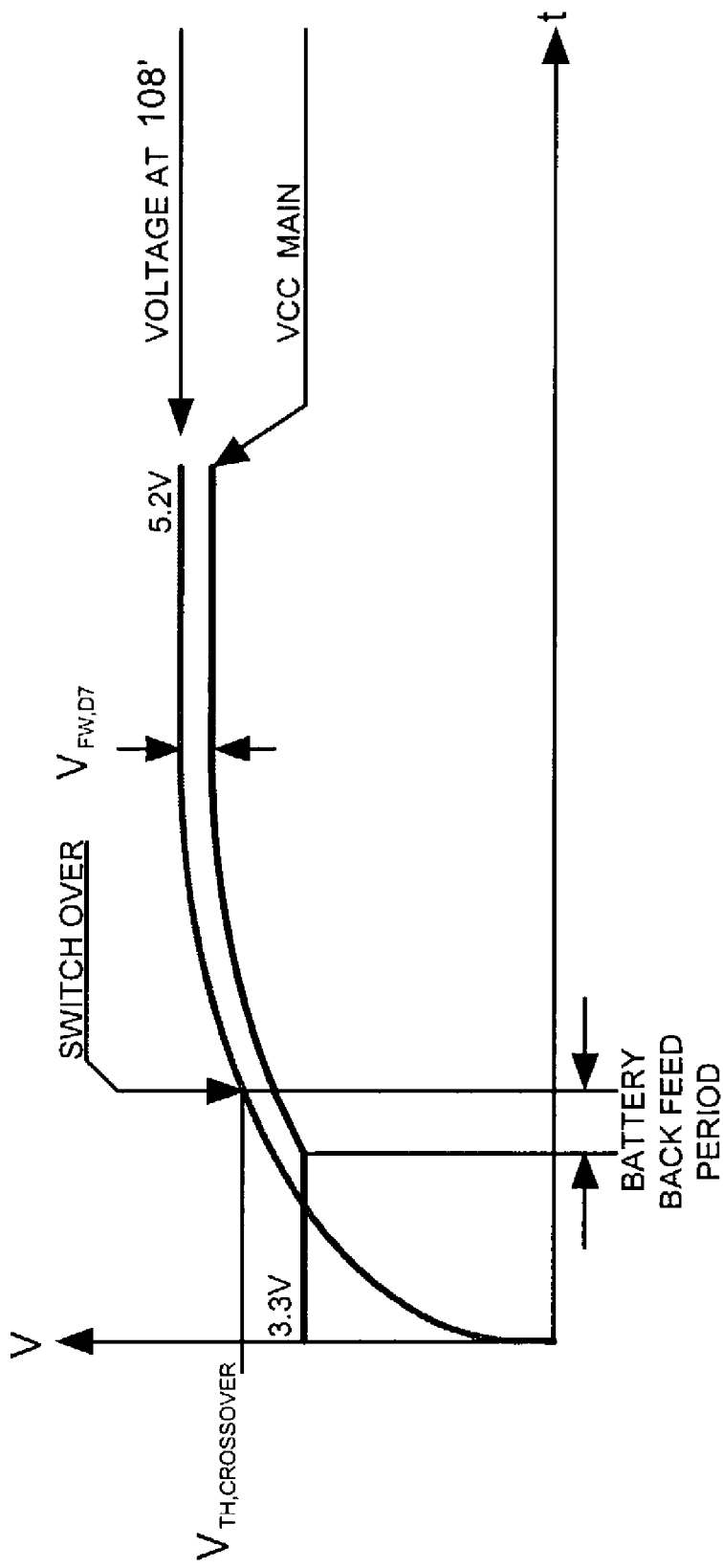
FIG. 6 shows an exemplary response waveforms for the switchover state where the battery is low and the FireWire is plugged.

FIG. 6 shows an exemplary response waveforms for the switchover state where the battery is low and the FireWire is plugged. In the described embodiment, the battery is considered empty when it's voltage drops below 3.45V. For the purpose of this discussion only therefore, the battery voltage is considered to be at 3.3V. If the battery voltage drops below 3.45V the system is turned off and less than 2 mA are drawn from the battery. Therefore the voltage the main bus 110 is approximately equal to the battery voltage $V_{BAT}$=3.3V. After the FireWire connector 104 is plugged into the port 106, output 108' increases. If output 108' increases above $V_{VCC\_MAIN}$ of 3.3V, the voltage sensor 114 starts conducting. The battery will be back fed from then on, until output 108' reaches the switch over threshold.

Figure 7:
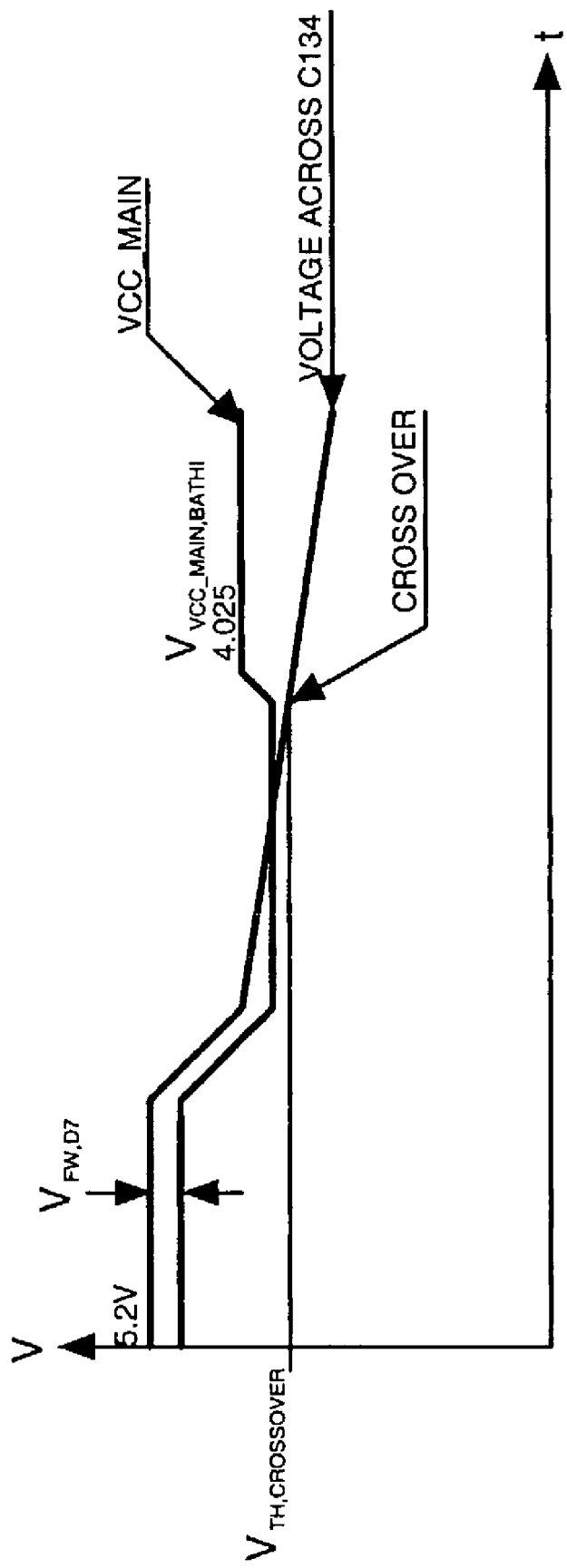
FIG. 7 shows an exemplary response waveforms for the switchover state where the battery is low and the FireWire is unplugged.

FIG. 7 shows an exemplary response waveforms for the switchover state where the battery is low and the FireWire is unplugged. Initially, the voltage $V_{VCC\_MAIN}$ on the main bus 110 is Vf below the voltage of the FireWire voltage converter 108 resulting in the output 108' dropping off rapidly. When output 108' drops below the switch over threshold $V_{switch}$, voltage converter 108 is going to back feed into the battery until output 108' drops below a level where voltage sensor 114 loses conduction. If the latter occurs, output 108' is going to be discharged much slower as it is disconnected from the rest of the system. It has to be noted that this particular scenario is very rare as the battery voltage recovers within short periods of time to a level that is above the 3.45V system shut down threshold.

Figure 8:
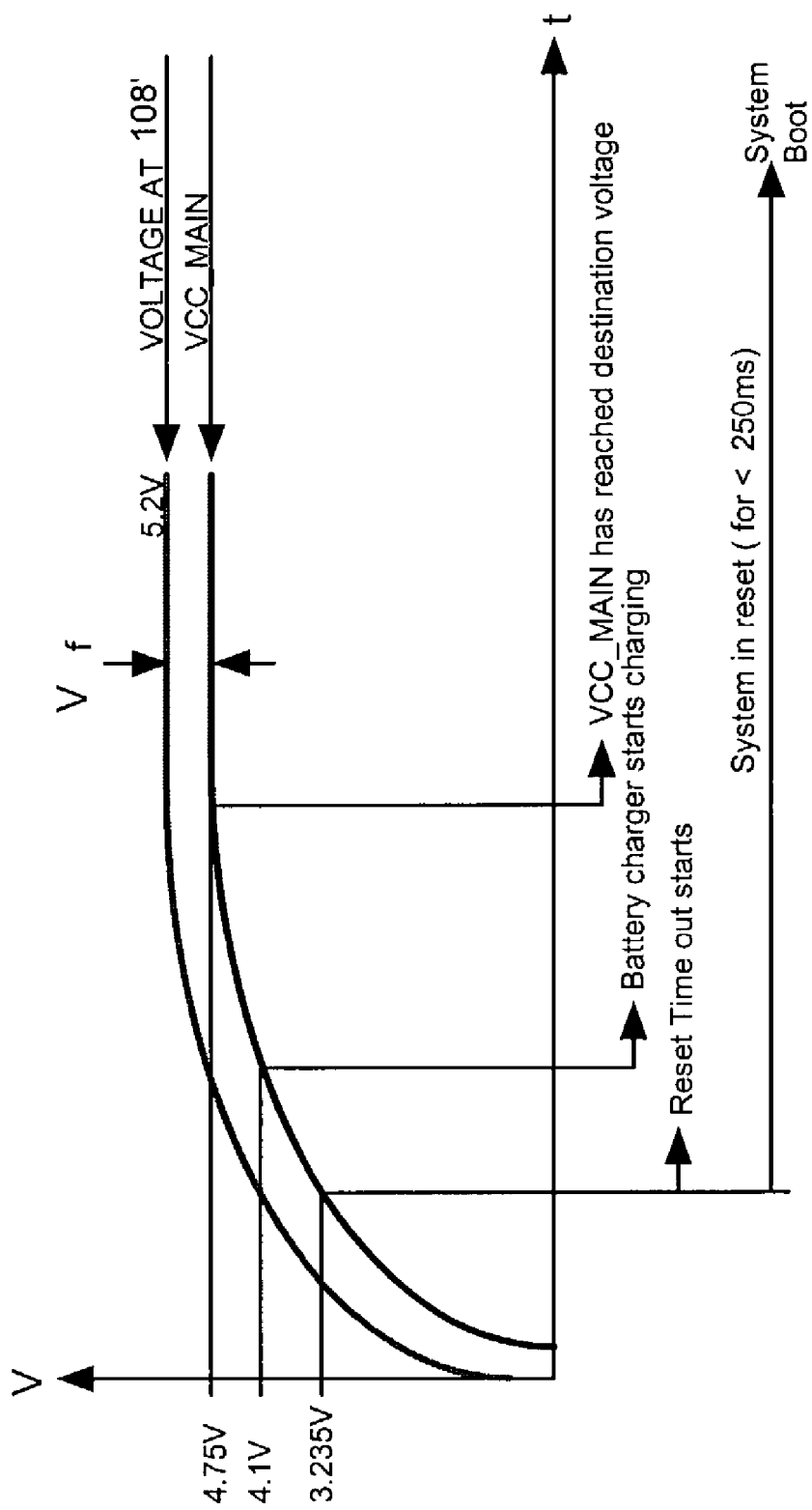
FIG. 8 shows an exemplary response waveforms for the switchover state where the battery is empty and the FireWire is plugged.

FIG. 8 shows an exemplary response waveforms for the switchover state where the battery is empty and the FireWire is plugged. When the battery is empty, $V_{VCC\_MAIN}$ is initially approximately ground level and the battery charger circuit is disabled. If output 108' charges up, $V_{VCC\_MAIN}$ is approximately one diode forward voltage drop below output 108'. (It should be noted that a reset circuit keeps the system 100 in constant reset below voltages of 3.135V) thereby enabling a battery charger circuit. If battery charger circuit supply voltage has exceeded the lockout voltage of 4.1V, battery back feeding is prevented because the battery 120 is disconnected from the system 100. The battery charger is activated when it's supply voltage exceeds the under voltage lock out threshold of 4.1V. To enable the battery charger, the voltage at the output of the FireWire voltage converter 108 must be one forward diode drop above the lock out voltage of the battery charger. Therefore, output 108' has to rise above approximately 4.6V to activate the charger.

Figure 9:
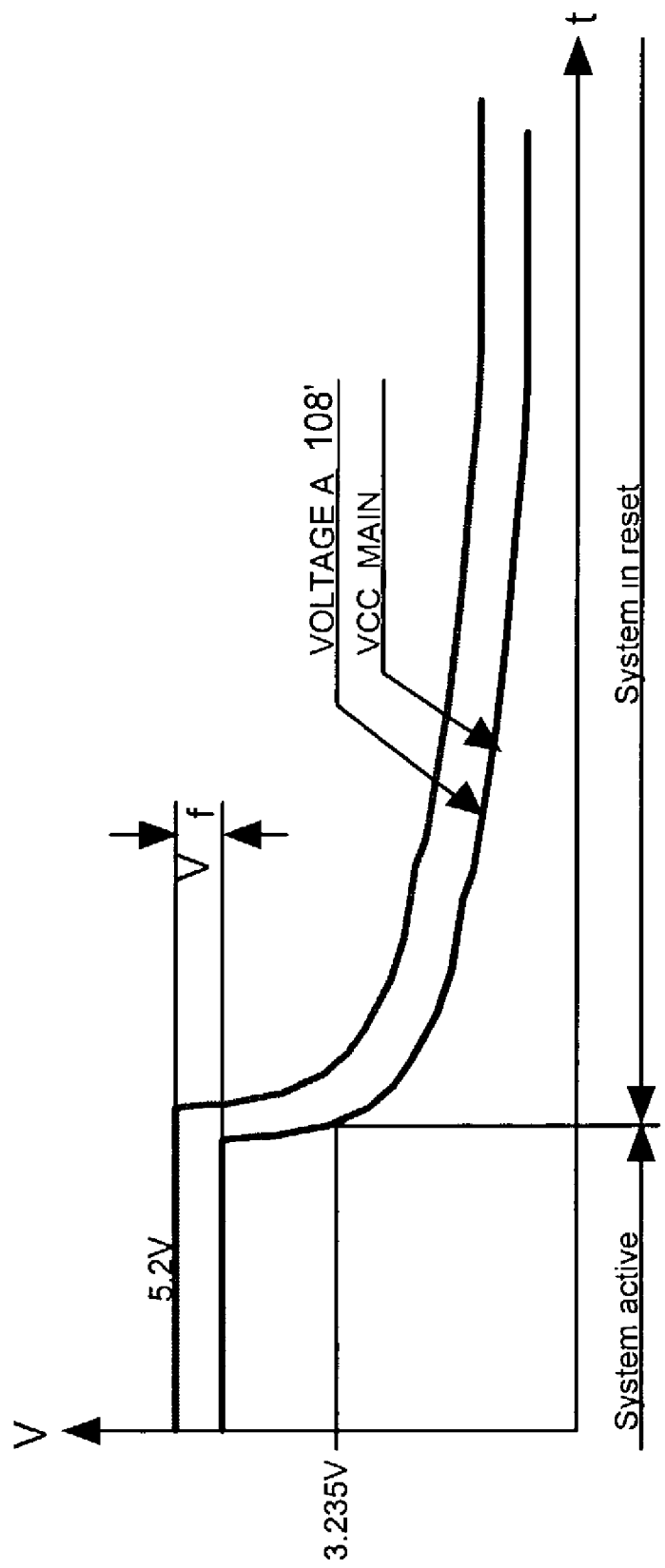
FIG. 9 shows an exemplary response waveforms for the switchover state where the battery is empty and the FireWire is unplugged.

FIG. 9 shows an exemplary response waveforms for the switchover state where the battery is empty and the FireWire is unplugged. When the battery is empty and FireWire 104 is unplugged, the system 100 will run until $V_{VCC\_MAIN}$ drops rapidly below reset threshold voltage $V_{reset,TH}$. In reset, the battery disconnect circuitry disconnects the battery from the system 100 when the battery voltage drops below 3.1V to avoid deep discharge of the battery using a low voltage disconnect circuitry.

Although only a few embodiments of the present invention have been described, it should be understood that the present invention may be embodied in many other specific forms without departing from the spirit or the scope of the present invention. Therefore, the present examples are to be considered as illustrative and not restrictive, and the invention is not to be limited to the details given herein, but may be modified within the scope of the appended claims along with their full scope of equivalents.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

What is claimed is:

1. A power manager unit for managing power delivered to a battery powered device, comprising:
   a voltage converter unit arranged to convert an external voltage received by an external voltage supply by way of a cable to a supply voltage, wherein the cable includes a number of lines some of which are data lines arranged to form a transmit-receive connection and at least one of which is a power line arranged to carry the external voltage from the external voltage supply to the battery powered device;
   a voltage sensor unit coupled to the voltage converter unit for sensing a voltage;
   a comparator unit coupled to the voltage sensor unit arranged to generate a switching signal based upon the sensed voltage; and
   a switchover circuit coupled to the comparator unit arranged to receive the switching signal, wherein the switchover circuit responds to the received switching signal by connecting the battery powered device and a not fully charged battery to the voltage converter unit such that the supply voltage is provided thereto, wherein when the battery is substantially fully charged, the switchover circuit responds by electrically disconnecting the battery so as to not overcharge the battery.

2. A power management unit as recited in claim 1, further camprising:
   an input current limiter arranged to suppress a power surge resulting from a received external voltage derived from an insertion event of the power line when the power line is carrying the external voltage.

3. A power management unit as recited claim 2 wherein during a power cable removal event, the comparator unit sends a second signal to the switchover circuit.

4. A power management unit as recited in claim 3, wherein the switchover circuit responds to the second signal by
   substantially simultaneously disconnecting the main bus from the power line, and
   connecting the battery to the battery powered device.

5. A power management unit as recited in claim 1, wherein the data lines are separately-shielded twisted transmission type data lines.

6. A power management unit as recited in claim 1, wherein the cable is a I.E.E.E. 1394 compliant cable.

7. A method for managing power delivered to a battery-operated peripheral device, comprising:
   receiving an external voltage from an external voltage supply by way of a cable, wherein the cable includes a number of lines some of which are data lines arranged to form a transmit-receive connection and at least one of which is a power line arranged to carry the external voltage from the external voltage supply to the device;
   converting the received external voltage to a supply voltage by a voltage converter unit;

sensing a voltage by a voltage sensor unit coupled to the voltage converter unit;

generating a switching signal based upon the sensed voltage;

receiving the switching signal by a switchover circuit; and connecting the peripheral device and a not fully charged battery to the voltage converter unit such that the supply voltage is provided thereto in response to the received switching signal, wherein when the battery is substantially fully charged, the switchover circuit responds by electrically isolating the battery from the external voltage supply.

8. A method as recited in claim 7, further comprising:

suppressing a power surge associated with a power line insertion event.

9. A method far managing power as recited in claim 7, further comprising:

during a power line removal event, sending a signal to the switchover circuit in response to the power line removal event; and in response to the signal, substantially simultaneously disconnecting the main bus from the peripheral device and connecting the battery to the peripheral device.

10. A method as recited in claim 7, wherein the data lines are separately-shielded twisted transmission type data lines.

11. A method as recited in claim 10, wherein the cable is a I.E.E.E. 1394 compliant cable.

12. An apparatus for managing power delivered to a battery-operated peripheral device, comprising:

means for receiving an external voltage from an external voltage supply by way of a cable, wherein the cable includes a number of lines some of which are data lines arranged to form a transmit-receive connection and at least one of which is a power line arranged to carry the external voltage from the external power supply to the device;

means for converting a received external voltage to a supply voltage;

means for sensing a voltage;

means for generating a switching signal based upon the sensed voltage;

means for receiving the switching signal by a switchover circuit; and means for connecting the peripheral device and a not fully charged battery to the supply voltage in response to the received switching signal.

13. An apparatus as recited in claim 12, further comprising:

wherein when the battery is substantially fully charged, means for electrically isolating the battery from the external voltage supply.

14. An apparatus as recited in claim 12, further comprising:

means for suppressing a power surge associated wit a power line insertion event;

during a power line removal event, means for sending a signal to the switchover circuit in response to the power line removal event; and means for substantially simultaneously disconnecting the main bus from the peripheral device and connecting the battery to the peripheral device.

15. An apparatus as recited in claim 14, wherein the cable the data lines are separately-shielded twisted transmission type data lines.

16. An apparatus as recited in claim 15, wherein the cable is a I.E.E.E. 1394 compliant cable.

* * * * *

UNITED STATES PATENT AND TRADEMARK OFFICE
CERTIFICATE OF CORRECTION

PATENT NO. : 6,995,963 B2
APPLICATION NO. : 10/278752
DATED : February 7, 2006
INVENTOR(S) : Fadell et al.

It is certified that error appears in the above-identified patent and that said Letters Patent is hereby corrected as shown below:

(column 6, line 38) change "camprising" to --comprising--.

(column 6, line 43) add --in-- after "recited".

(column 7, line 16) change "method far" to --method for--.

(column 8, line 21) change "wit a" to --with a--.

Signed and Sealed this

Twelfth Day of September, 2006

JON W. DUDAS
*Director of the United States Patent and Trademark Office*